US011978983B2

(12) United States Patent
Jung et al.

(10) Patent No.: US 11,978,983 B2
(45) **Date of Patent: *May 7, 2024**

(54) CONNECTOR ASSEMBLY FOR USE IN A VEHICLE

(71) Applicants: HYUNDAI MOTOR COMPANY, Seoul (KR); KIA CORPORATION, Seoul (KR); KUM LLC, Ulsan (KR)

(72) Inventors: Yun Jae Jung, Suwon-si (KR); Chan Gu Yun, Gimhae-si (KR); Anbumani Neelamegam, Andimadam (IN)

(73) Assignees: HYUNDAI MOTOR COMPANY, Seoul (KR); KIA CORPORATION, Seoul (KR); KUM LLC, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/195,681

(22) Filed: May 10, 2023

(65) Prior Publication Data

US 2023/0275373 A1 Aug. 31, 2023

Related U.S. Application Data

(63) Continuation of application No. 17/462,245, filed on Aug. 31, 2021, now Pat. No. 11,688,979.

(30) Foreign Application Priority Data

Dec. 28, 2020 (KR) ........................ 10-2020-0184117

(51) Int. Cl.

| | |
|---|---|
| ***H01R 13/629*** | (2006.01) |
| ***H01R 13/648*** | (2006.01) |
| *H01R 13/6581* | (2011.01) |

(52) U.S. Cl.

CPC ... *H01R 13/6485* (2013.01); *H01R 13/62955* (2013.01); *H01R 13/6581* (2013.01); *H01R 2201/26* (2013.01)

(58) Field of Classification Search

CPC .......... H01R 13/6485; H01R 13/62955; H01R 13/6581; H01R 2201/26

See application file for complete search history.

(56) References Cited

U.S. PATENT DOCUMENTS

| | | | |
|---|---|---|---|
| 5,709,560 | A | 1/1998 | Hio |
| 5,735,702 | A | 4/1998 | Hio |

(Continued)

FOREIGN PATENT DOCUMENTS

| | | | |
|---|---|---|---|
| KR | 10-1234338 | B | 2/2013 |
| KR | 2019-0119280 | A | 10/2019 |

*Primary Examiner* — Thanh Tam T Le

(74) *Attorney, Agent, or Firm* — MCDONNELL BOEHNEN HULBERT & BERGHOFF LLP

(57) ABSTRACT

A connector assembly enables electrically safe disconnection and separation because it is possible to secure an interval between the point of time of separation of interlock terminals and the point of time of separation of power terminals when connectors are separated. The connector assembly can implement two steps of cutting power after restricting a lever in a locked state and then completely disconnecting connectors by additionally operating the lever by including an intermediate locking mechanism that restricts the lever for disconnecting connectors in a state in which interlock terminals of two connectors are separated from each other but power terminals of the two connectors are in contact with each other to disconnect and separate female and male connectors.

10 Claims, 13 Drawing Sheets

(56) References Cited

U.S. PATENT DOCUMENTS

| | | | | |
|---|---|---|---|---|
| 6,439,902 | B1 | 8/2002 | Cole et al. | |
| 6,623,286 | B2 | 9/2003 | Tachi | |
| 6,942,504 | B2 | 9/2005 | Shinozaki et al. | |
| 6,948,959 | B2 | 9/2005 | Miyamoto | |
| 7,052,294 | B1 | 5/2006 | Osada | |
| 7,090,518 | B1 | 8/2006 | Osada et al. | |
| 7,223,130 | B2 | 5/2007 | Osada et al. | |
| 7,241,156 | B1 | 7/2007 | Margrave et al. | |
| 7,311,535 | B2 | 12/2007 | Taguchi et al. | |
| 7,351,094 | B2 | 4/2008 | Miyamoto | |
| 7,384,286 | B2 | 6/2008 | Imai et al. | |
| 7,407,396 | B2 | 8/2008 | Dillon et al. | |
| 7,445,491 | B2 * | 11/2008 | Fujii | H01R 13/62938 439/157 |
| 7,854,619 | B2 | 12/2010 | Takahashi et al. | |
| 10,103,490 | B2 | 10/2018 | Sugimoto | |
| 10,135,183 | B1 | 11/2018 | Probert et al. | |
| 10,630,025 | B2 | 4/2020 | Ikeya et al. | |
| 10,910,765 | B2 | 2/2021 | Ochiai | |
| 11,025,005 | B1 | 6/2021 | Shimizu | |
| 11,128,091 | B2 | 9/2021 | Kobayashi et al. | |
| 11,251,566 | B2 | 2/2022 | Akagi | |
| 11,527,855 | B2 * | 12/2022 | Jung | H01R 13/502 |
| 11,688,979 | B2 * | 6/2023 | Jung | H01R 13/62938 439/181 |
| 2020/0194938 | A1 | 6/2020 | Jung et al. | |

* cited by examiner

CONNECTOR ASSEMBLY FOR USE IN A VEHICLE

CROSS REFERENCE TO RELATED APPLICATIONS

The present application is a continuation of U.S. patent application Ser. No. 17/462,245, filed Aug. 31, 2021, which claims priority to Korean Patent Application No. 10-2020-0184117, filed on Dec. 28, 2020, the entire contents of which are incorporated herein for all purposes by this reference.

BACKGROUND

Field

The present disclosure relates to a connector assembly and, more particularly, to a connector assembly that enables electrically safe disconnection and separation because it is possible to secure an interval between the point of time of separation of interlock terminals and the point of time of separation of power terminals when connectors are separated.

Description of the Related Art

In general, connector assemblies for electrical connection are used for electric and electronic parts of a vehicle.

A connector assembly according to an example of the related art includes a female connector, a male connector, a connector position assurance (CPA) that shows whether the female and male connectors have been completely fastened, etc.

Accordingly, according to the connector assembly, it is possible to check the fastened state of the female and male connectors through the CPA after the female connector and the male connectors are fastened to each other.

A connector assembly according to another example of the related art includes a female connector, a male connector, a rotating lever for fastening the female and male connectors, and a device for lever position assurance that is coupled to the lever after the lever is rotated.

Accordingly, when the lever fastens the female and male connectors by rotating, and then the device for lever position assurance is fastened to the rotated lever, it is possible to check that the lever is the position where the lever fastens the female and male connectors to each other.

Meanwhile, connectors for electrical connection were used at low voltage of about 12V in the related art, but recently, as electric vehicles are manufactured, many connectors are used at a high voltage.

One of the problems with the connectors that are used at a high voltage is a generation of a spark. That is, connectors are damaged by a spark that is generated when the connectors are coupled or separated.

In order to solve this problem, power is supplied after terminals are coupled, and power is cut before the terminals are separated. To this end, an interlock function is usually applied to connectors.

The interlock function prevents a spark by connecting and cutting power before and after terminals are coupled, by providing a signal about coupled and separated states of the terminals.

According to a connector assembly employing the interlock function, an interlock terminal that provides a signal such that power supplied through power terminals is cut before the power terminals for power supply are separated is used.

However, when connectors of connector assemblies are quickly separated, power terminals for power supply are also separated within a very short time after interlock terminals are separated, so the interlock terminals cannot substantially show their function.

Connector assemblies according to the related art have the structure of a general high-voltage lever connector including an interlock terminal or a structure having an interlock terminal included in a specific part.

However, according to general high-voltage lever connectors, the interval between separation of a power terminal and separation of an interlock terminal when a connector is separated is short or there is no structure that can provide an interval, so an electrically dangerous situation (generation of a spark) may occur when the connector is separated.

Further, according to the structure having an interlock terminal included in a specific part, the interlock terminal is separated by shock due to external force, which may cause a dangerous situation. For example, when an interlock terminal is installed at a CPA, a current may be cut at a power terminal due to separation of the interlock terminal when the CPA is separated by external force, etc., which may cause a car accident.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made in an effort to solve the problems and an objective of the present disclosure is to provide a connector assembly that enables electrically safe disconnection and separation because it is possible to secure an interval between the point of time of separation of interlock terminals and the point of time of separation of power terminals when connectors are separated.

Another objective of the present disclosure is to provide a connector assembly that can solve the problem that a current of power terminals is cut when a signal of interlock terminals shows a separated state due to external shock, etc., by preventing disconnection between terminals as long as connectors are disconnected and that can reduce the possibility of a car accident due to cutting of a current of the power terminal.

The objectives of the present disclosure are not limited to those described above and other objectives not stated herein would be apparently understood by those who have ordinary skills in the art that the present disclosure belongs to (hereafter, 'those skilled in the art') from the following description.

In order to achieve the objectives, an embodiment of the present disclosure provides a connector assembly including a first connector having an interlock terminal and a power terminal, a second connector having an interlock terminal and a power terminal, a lever rotatably coupled to the second connector and moving the first connector in a connection direction and a disconnection direction with respect to the second connector when being rotated on the second connector, and an intermediate locking mechanism restricting rotation of the lever such that an intermediate locked state of the two connectors, in which the interlock terminals of the two connectors are separated from each other and the power terminals of the two connectors keep in contact with each other, can be maintained when the first connector is disconnected.

The intermediate locking mechanism may include locking protrusions formed at the lever, pressing portions formed at a connector housing of the second connector to be able to be pressed and bent, and protrusive steps formed to lock the locking protrusions of the lever such that the lever is no longer rotated in the disconnection direction of the connectors in the intermediate locked state of the two connectors.

The pressing portions may be formed in plate shapes extending forward from rear edges of the holes formed at the connector housing of the second connector to be positioned inside the holes, and may be bent into the connector housing.

The protrusive steps may be formed on outer surfaces of fronts of the pressing portions.

The lever may include lever bodies at left and right sides rotatably coupled to both left and right sides of the connector housing of the second connector, and a handle integrally connecting the lever bodies at the left and right sides.

The locking protrusions may be respectively formed at the lever bodies at the left and right sides of the lever.

The pressing portions may be respectively formed on left and right sides of the connector housing of the second connector.

Cooperative protrusions may be respectively formed on left and right sides of a connector housing of the first connector, guide holes in which the cooperative protrusions of the first connector are inserted may be respectively formed in left and right sides of the connector housing of the second connector, slots in which the cooperative protrusions passing through the guide holes are inserted may be respectively formed in the lever bodies at the left and right sides, and the slots of the lever bodies may be formed to have curved paths for guiding the cooperative protrusions along the guide holes when the lever is rotated.

Cooperative protrusions may be formed at the first connector, guide holes in which the cooperative protrusions of the first connector are inserted may be formed at the second connector, and the lever may move the cooperative protrusions along the guide holes of the second connector when rotating on the second connector together with the cooperative protrusions of the first connector.

Slots in which the cooperative protrusions passing through the guide holes are inserted may be formed at the lever, and the slots may be formed to have curved paths for guiding the cooperative protrusions along the guide holes when the lever is rotated.

According to the connector assembly of the present disclosure, it is possible to implement two steps of cutting power after restricting a lever in a locked state and then completely disconnecting connectors by additionally operating the lever by including an intermediate locking mechanism that restricts the lever for disconnecting connectors in a state in which interlock terminals of two connectors are separated from each other but power terminals of the two connectors are in contact with each other to disconnect and separate female and male connectors.

As a result, since it is possible to secure a sufficient interval between separation of interlock terminals and separation of power terminals, it is possible to stably cut power between the power terminals and it is also possible to safely completely separate two connectors in the intermediate locked state.

In particular, it is possible to safely disconnect connectors with a spark that occurs in the related art, and it is possible to prevent deformation or damage to the connectors due to a spark.

BRIEF DESCRIPTION OF THE FIGURES

The above and other objectives, features and other advantages of the present disclosure will be more clearly understood from the following detailed description when taken in conjunction with the accompanying drawings, in which.

DETAILED DESCRIPTION

Figure 1:
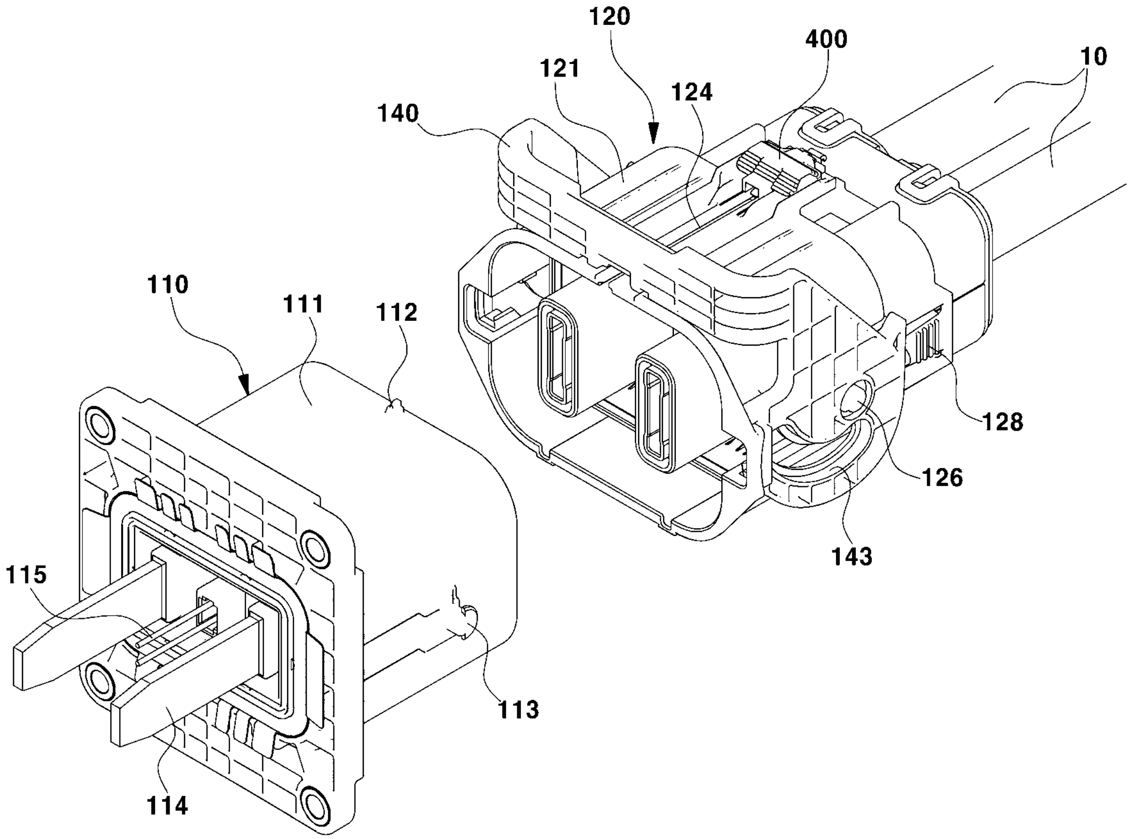
FIG. 1 is a perspective view showing the state in which female and male connectors are separated in a connector assembly according to an embodiment of the present disclosure.

Description of specific structures and functions disclosed in embodiments of the present disclosure are only an example for describing the embodiments according to the concept of the present disclosure and the embodiments according to the concept of the present disclosure may be implemented in various ways. The present disclosure is not limited to the embodiments described herein and should be construed as including all changes, equivalents, and replacements that are included in the spirit and the range of the present disclosure.

It will be understood that, although the terms first and/or second, etc., may be used herein to describe various elements, but these elements should not be limited by these terms. These terms are only used to distinguish one element from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

Like reference numerals indicate the same components throughout the specification. The terms used herein are provided to describe embodiments without limiting the present disclosure. In the specification, a singular form includes a plural form unless specifically stated in the sentences. The terms "comprise" and/or "comprising" used herein do not exclude that another component, step, operation, and/or element exist or are added in the stated component, step, operation, and/or element.

Embodiments of the present disclosure will be described hereafter in detail with reference to the accompanying drawings.

Figure 2:
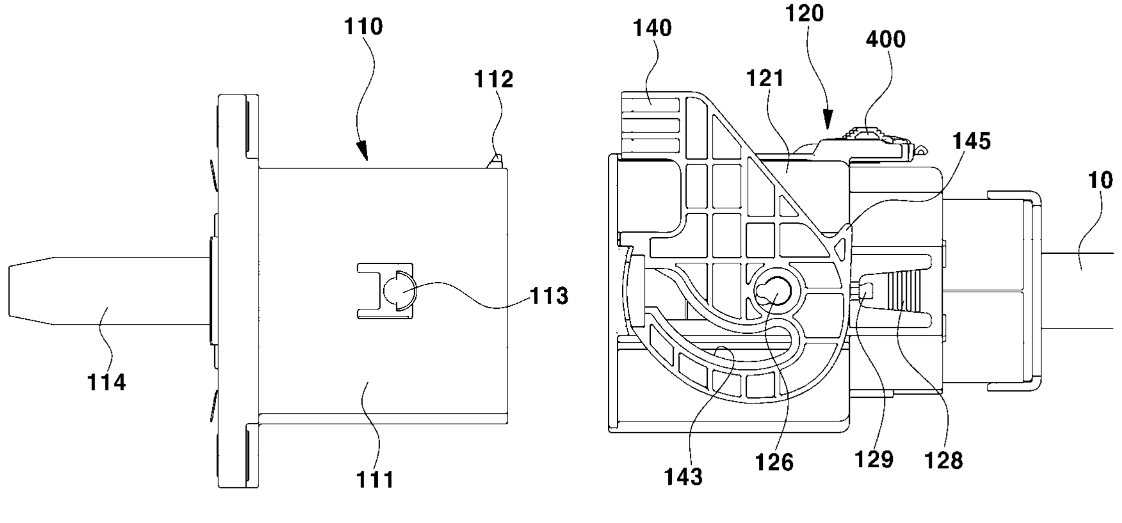
FIG. 2 is a side view showing the state in which the female and male connectors are separated in the connector assembly according to an embodiment of the present disclosure.

FIG. 1 is a perspective view showing the state in which female and male connectors are separated in a connector assembly according to an embodiment of the present disclosure and FIG. 2 is a side view showing the state in which the female and male connectors are separated in the connector assembly according to an embodiment of the present disclosure.

Figure 3:
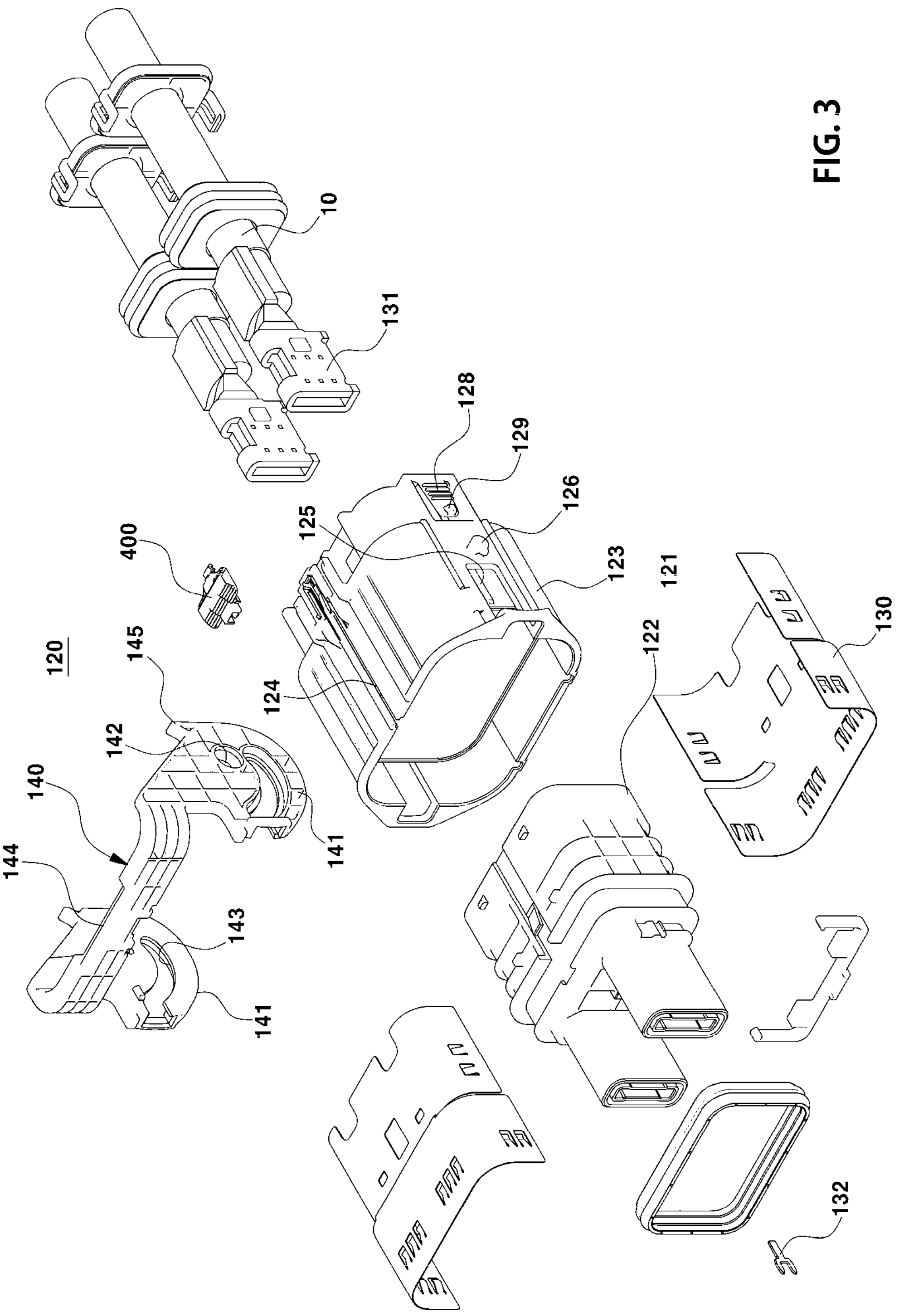
FIG. 3 is an exploded perspective view of the female connector of the connector assembly according to an embodiment of the present disclosure.
Figure 4A:
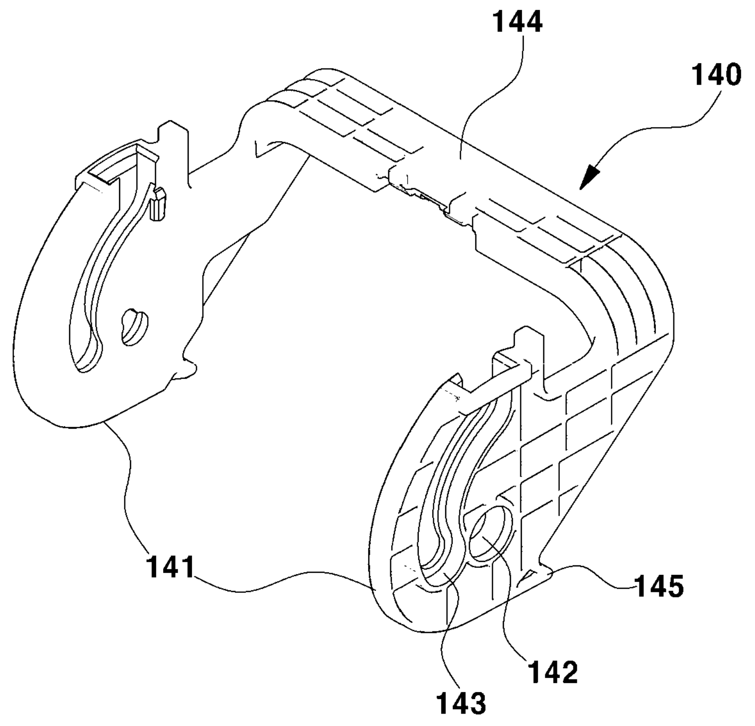
FIGS. 4A and 4B are a perspective view and a side view showing a lever of the connector assembly according to an embodiment of the present disclosure.
Figure 4B:
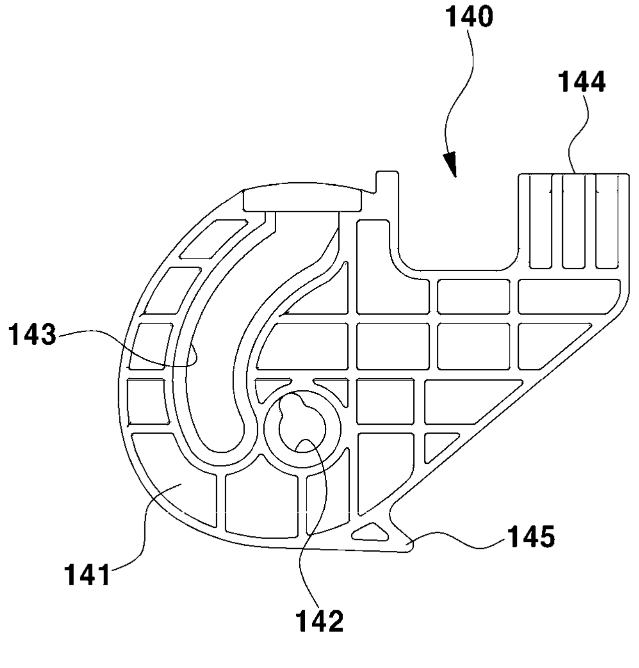
Figure 5:
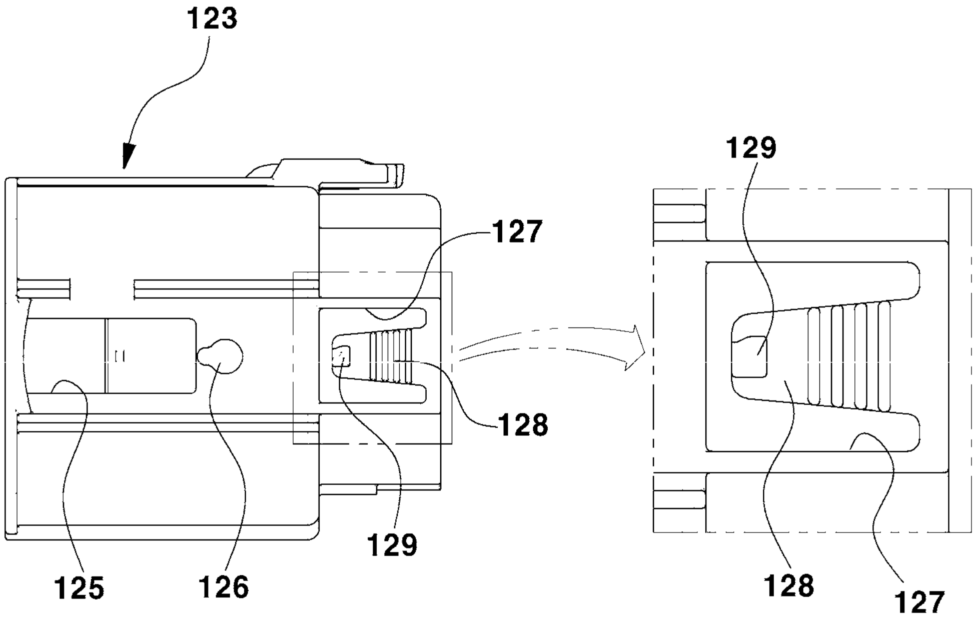
FIG. 5 is a side view showing a connector housing (outer housing) of a second connector having a pressing portion and a protrusive step in the connector assembly according to an embodiment of the present disclosure.

FIG. 3 is an exploded perspective view of the female connector of the connector assembly according to an embodiment of the present disclosure and FIGS. 4A and 4B are a perspective view and a side view showing a lever of the connector assembly according to an embodiment of the present disclosure. FIG. 5 is a side view showing a connector housing (outer housing) of a second connector having a pressing portion and a protrusive step in the connector assembly according to an embodiment of the present disclosure.

A connector assembly according to an embodiment of the present disclosure, which is for electrically connecting electric and electronic parts, as shown in FIG. 1, includes a first connector 110, a second connector 120, and a lever 140 that fastens (electrically connect) or disconnect the first connector 110 and the second connector 120.

In this configuration, the first connector 110 may be a male connector and the second connector 120 may be a female connector. The first connector 110 includes a connector housing 111, and a power terminal 114 and an interlock terminal 115 that are disposed in the connector housing 111.

The power terminal 114 is a terminal through which a main current flows and the interlock terminal 115, 132 is a signal terminal for outputting a signal showing a connector state.

A position confirmation protrusion 112 is formed at the front end of the top of the connector housing 111, and cooperative protrusions 113 are formed on both left and right sides of the first connector 110.

The second connector 120, as shown in FIG. 3, includes a connector housing 121, and a power terminal 131 and an interlock terminal 132 disposed in the connector housing 121.

The power terminal 131 of the second connector 120 is electrically connected to an end of the core wire of a wire 10. The connector housing 121 of the second connector 120 is composed of an inner housing 122 and an outer housing 123, and a shield shell 130 is disposed between the inner housing 122 and the outer housing 123.

The inner housing 122 of the second connector 120 is formed to protect the power terminal 131 inserted in the inner housing 122. The shield shell 130 of the second connector 120 can be connected to a shield shell (not shown) of the first connector 110 when the first connector 120 and the second connector 120 are combined. Since the shield shells of the connectors are connected, a shield structure that can block an electrical field between the first connector 110 and the second connector 120 is formed.

Guide holes 124 and 125 in which the position confirmation protrusion 112 and the cooperative protrusions 113 of the first connector 110 are respectively inserted are formed in the outer housing 123 of the second connector 120.

That is, a first guide hole 124 in which the position confirmation protrusion 112 of the first connector 110 is inserted and guided forward and backward is formed on the top of the outer housing 123. Second guide holes 124 in which cooperative protrusions 113 of the first connector 110 are respectively inserted and guided forward and backward are formed on the left and right sides of the outer housing 123.

The first guide hole 124 and the second guide holes 125 are elongated forward and backward in the outer housing 123 of the second connector 120. Accordingly, when the first connector 110 and the second connector 120 are connected or disconnected, the position confirmation protrusion 112 of the first connector 110 is guided and moved forward and backward along the first guide hole 124 and the cooperative protrusions 113 are guided and moved forward and backward along the second guide holes 125.

Hinge protrusions 126 that are hinge-like coupling portions for the lever 140 are formed on left and right sides of the outer housing 123 of the second connector 120 and are positioned behind the second guide holes 125.

The lever 140 has left and right lever bodies 141 rotatably coupled to left and right sides of the connector housing 121 (outer housing) of the second connector 120, and a handle 144 integrally connecting the lever bodies 141 at left and right sides.

A hinge hole 142 is formed at each of the lever bodies 141 at the left and right sides of the lever 140 and the hinge protrusions 126 of the outer housing 123 are inserted in the hinge holes 142. Accordingly, the lever 140 can be rotated about the hinge protrusions 126 and the hinge holes 142 of the outer housing 123.

The lever bodies 141 of the lever 140 can move forward and backward the cooperative protrusions 113 of the first connector 110 along the second guide holes 125 of the second connector 120 when the lever is rotated.

In more detail, in order to be able to move the cooperative protrusions 113 of the first connector 110 forward and backward along the second guide holes 125 of the second connector 120 when the lever 140 is rotated about the hinge protrusions 126 and the hinge holes 142 that are hinge-coupling portions for the outer housing 123, slots 143 in which the cooperative protrusions 113 on the left and right sides of the first connector 110 are formed at the lever bodies 141 of the lever 140, respectively.

As described above, the cooperative protrusion 113 of the first connector 110 are inserted in the second guide holes 125 of the outer housing 123 of the second connector 120 and are also inserted in the slots 143 of the lever 140. Accordingly, the cooperative protrusions 113 are moved along the slots 143 of the lever 140 and the second guide holes 125 of the second connector 120 when the lever 140 is rotated. In particular, the slots 143 of the lever 140 apply force that moves the cooperative protrusions 113 along the second guide holes 125 to the cooperative protrusions when the lever is rotated.

The slots 143 are elongated substantially up and down in the lever bodies 141 of the lever 140. The slots 143 are formed to have a curved path that can guide the cooperative protrusions 113 of the first connector 110 inserted therein forward and backward along the second guide holes 125 of the second connector 120 (outer housing) when the lever 140 is rotated about the hinge protrusions 126 and the hinge holes 142.

Accordingly, when the lever 140 is rotated, the cooperative protrusions 113 of the first connector 110 inserted in the slots 143 having the curved path are guided and pushed or pulled along the slots 143, so the cooperative protrusions 113 can be moved forward and backward along the second guide holes 125 of the second connector 120.

After the first connector 110 and the second connector 120 are fastened, when the lever 140 is rotated with the connector housing 111 of the first connector 110 inserted in the outer housing 123 of the second connector 120, the connector housing 111 of the first connector 110 is moved in the outer housing 123 of the second connector 120, whereby terminals are connected.

That is, when an operator rotates the lever 140 by pushing down the handle 144, the cooperative protrusions 113 of the first connector 110 inserted in both of the slots 143 of the lever 140 and the second guide holes 125 of the outer housing 123 are pulled backward in the second guide holes 125 by the slots 143. As the cooperative protrusions 113 are moved backward in the second guide holes 125 of the second connector 120, the first connector 110 is pulled and inserted deeper inside the second connector 120.

As a result, after the lever 140 is fully rotated such that the first connector 110 is completely locked to the second connector 120, the handle 144 of the lever 140 is fastened to a position confirmation device 400 installed on the outer housing 123 of the second connector 120.

The handle 144 of the lever 140 is a part for rotating the lever 140. When an operator rotates the lever 140 downward with the handle in his/her hand to completely lock the first connector 110 and the second connector 120 to each other, the lever 140 is rotated downward about the hinge protrusions 126 of the second connector 120.

After the lever 140 is fully rotated downward, the handle 144 is fastened and fixed to the position confirmation device 400 and the lever 140 is completely fixed to the second connector 120, whereby the two connectors 110 and 120 can keep fastened and locked to each other.

Meanwhile, the connector assembly according to an embodiment of the present disclosure further includes an intermediate locking mechanism that restricts rotation of the lever in an intermediate locked state of the two connectors in which the interlock terminals 115 and 132 of the first connector 110 and the second connector 120 are separated from each other, and the power terminals 114 and 131 keep connected to each other when the first connector 110 is disconnected.

In an embodiment of the present disclosure, the intermediate locking mechanism has locking protrusions 145 of the lever 140 and pressing portions 128 and protrusive steps 129 of the second connector 120.

In more detail, as shown in FIGS. 4A and 4B, the locking protrusions 145 are formed at the lower ends of the left and right sides of the lever 140, in detail, at the lower ends of the left and right bodies 141 of the lever 140.

As shown in FIG. 5, the pressing portions 128 that can be pressed inside the outer housing 123 are formed on left and right sides of the rear portion of the outer housing 123 of the second connector 120. The protrusive steps 129 that can lock the locking protrusions 145 of the lever 140 are formed at the front ends of the pressing portions 128, respectively.

In an embodiment of the present disclosure, the pressing portions 128 are respectively positioned in holes (127 in FIGS. 5 and 6B) formed in left and right sides of the outer housing 123. In more detail, the pressing portions 128 are formed in plate shapes extending forward from rear edges of the holes 127 to be positioned inside the holes.

When the pressing portions 128 are pressed into the outer housing 123, the pressing portions 128 can be pressed and bent into the housing 123 about the rear ends. The protrusive steps 129 that can lock the locking protrusions 145 of the lever 140 are formed on the outer surfaces of the fronts of the pressing portions 128, respectively.

In particular, when the lever 140 is rotated to an intermediate locked position to be described below from the complete locked position to unlock and separate the connectors, the locking protrusions 145 of the lever 140 are locked to the protrusive steps 129 of the pressing portions 128, whereby rotation of the lever 140 can be restricted such that the lever 140 is no longer rotated.

Figure 6A:
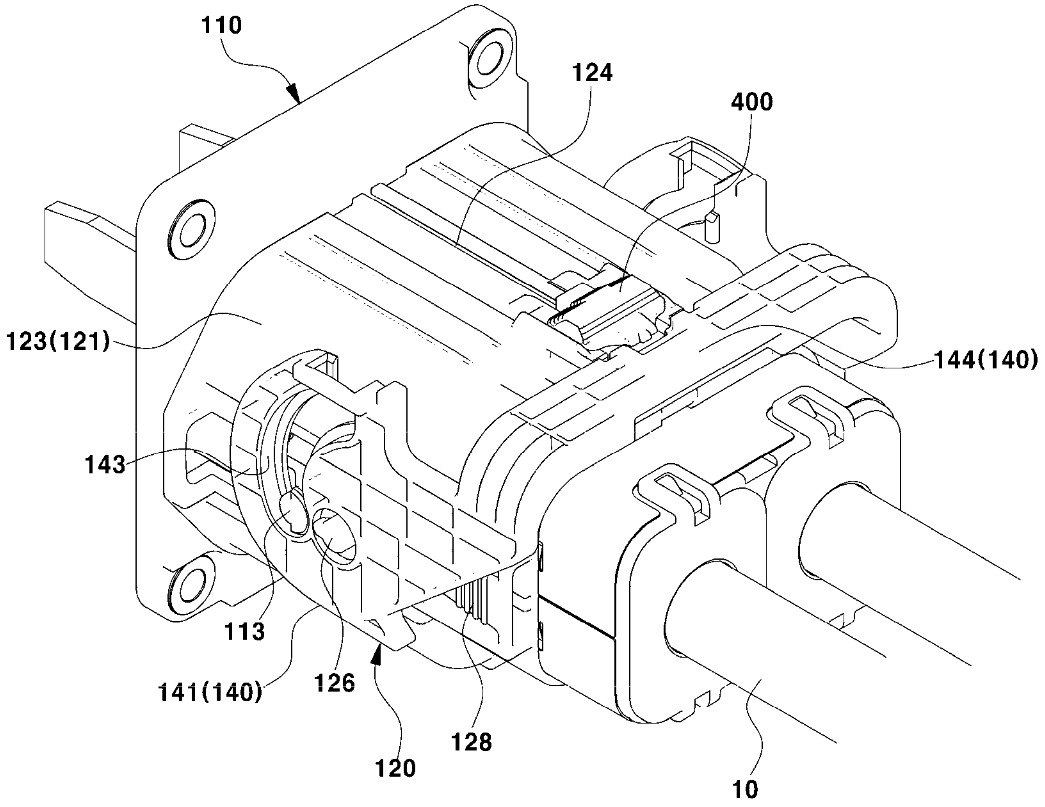
FIGS. 6A and 6B are perspective view showing a complete locked state and an intermediate locked state of the connector assembly according to an embodiment of the present disclosure.
Figure 6B:
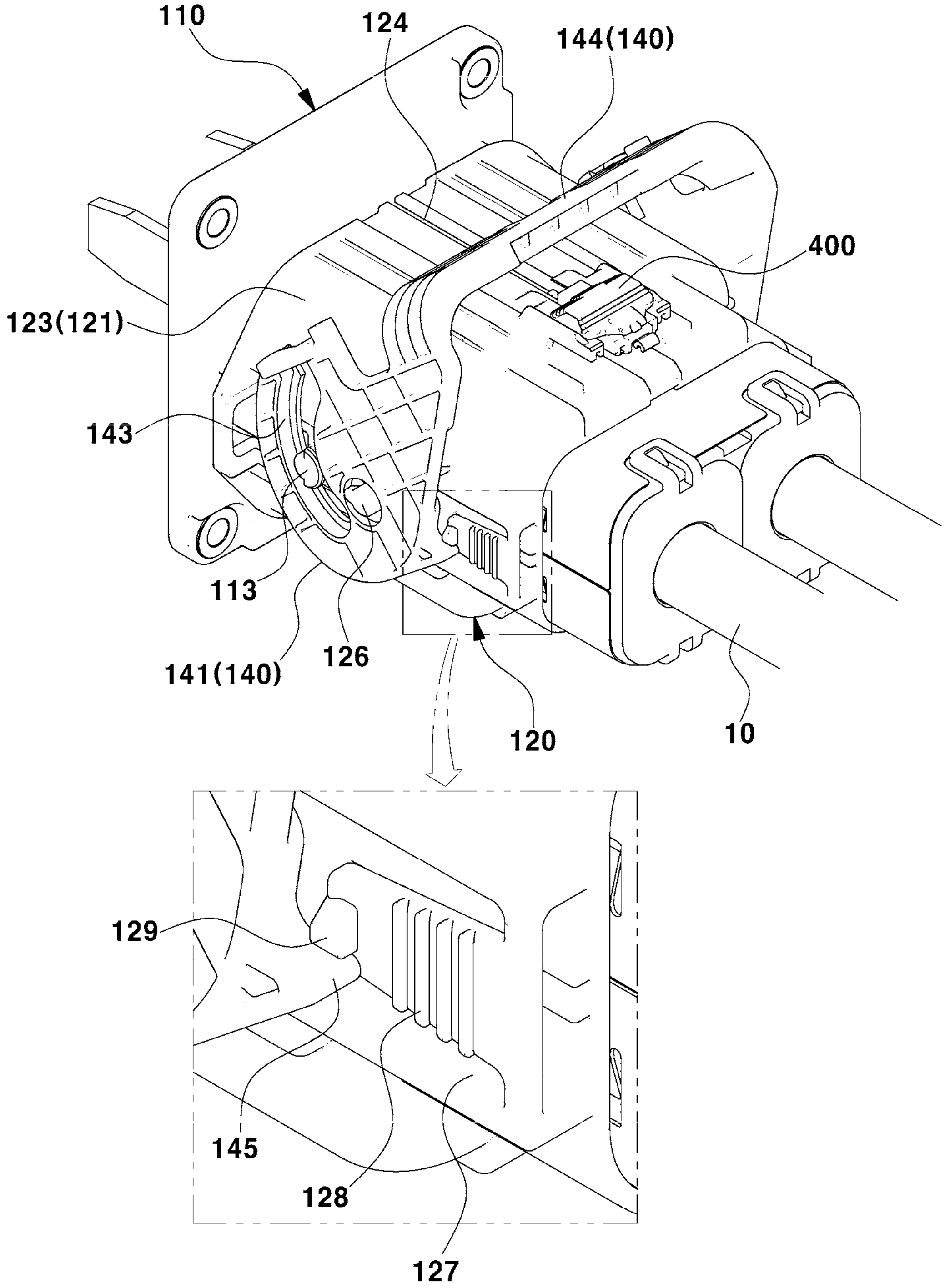
Figure 7A:
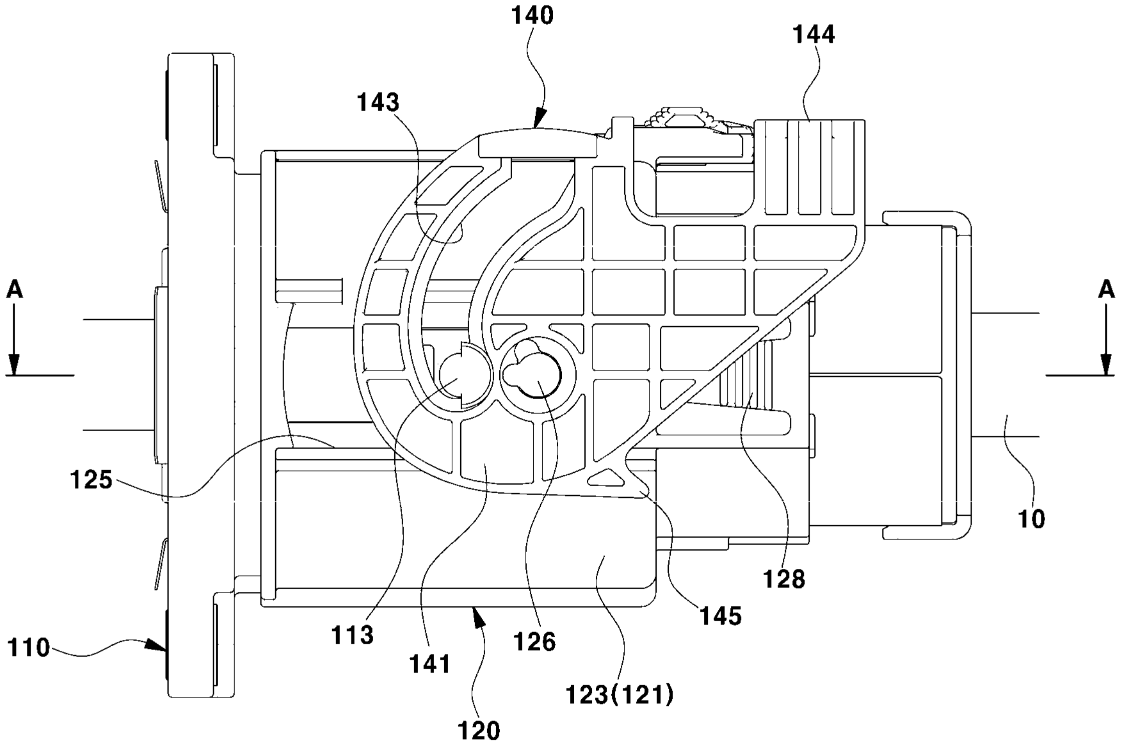
FIGS. 7A and 7B are side view showing the complete locked state and the intermediate locked state of the connector assembly according to an embodiment of the present disclosure.
Figure 7B:
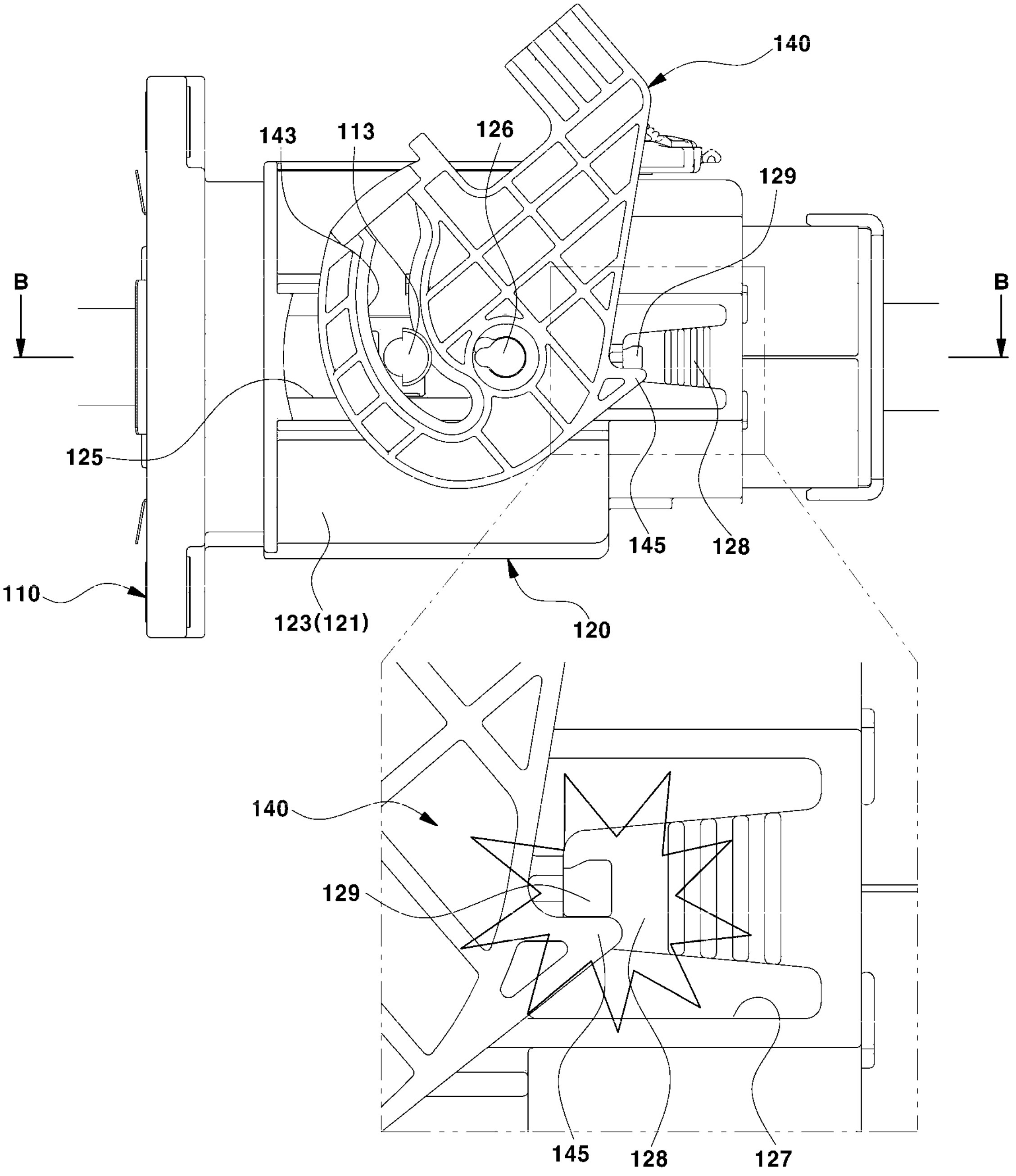

FIGS. 6A and 6B are perspective view showing a complete locked state and an intermediate locked state of the connector assembly according to an embodiment of the present disclosure, and FIGS. 7A and 7B are side view showing the complete locked state and the intermediate locked state of the connector assembly according to an embodiment of the present disclosure. FIGS. 6A and 7A show the complete locked state of the first connector 110 and the second connector 120 and FIGS. 6B and 7B show the intermediate locked state of the first connector 110 and the second connector 120.

In the connector assembly according to an embodiment of the present disclosure, when the first connector 110 and the second connector 120 are separated to remove the connected and fastened state thereof, the connectors are separated in two steps of operating the lever and disconnecting.

That is, in the complete locked state in which the interlock terminals 115 and 132 and the power terminals 114 and 131 of the first connector 110 and the second connector 120 are all electrically connected to each other, respectively, in order to disconnect and separate the two connectors, the lever 140 is rotated until the first connector 110 and the second connector 120 are moved into the intermediate locked state, and then the lever 140 is further rotated such that the first connector 110 and the second connector 120 are completely disconnected after the locking protrusions 145 are unlocked from the protrusive steps 129 of the pressing portions 128 by pressing the pressing portions 128 at the left and right sides into the outer housing 123.

In the present disclosure, the complete locked state of the first connector 110 and the second connector 120 means the state in which the interlock terminals 115 and 132 and the power terminals 114 and 131 of the two connectors are all connected in contact with each other, respectively. Further, in the present disclosure, the intermediate locked state of the first connector 110 and the second connector 120 is an intermediate step for disconnecting and separating the two connectors, and means the state in which only the interlock terminals 115 and 132 of the two connectors are separated without the power terminals 114 and 141 in contact with each other. Further, in the present disclosure, the complete disconnected state of the first connector 110 and the second connector 120 means the state in which the interlock terminals 115 and 132 and the power terminals 114 and 131 of the two connectors are all separated, respectively, and the connectors are completely disconnected.

Further, the complete locked state of the connector assembly according to an embodiment of the present disclosure, as shown in FIGS. 6A and 7A, is the state in which the lever 140 has been fully reclined downward, in which the handle 144 of the lever 140 is fastened and fixed to the position confirmation device 400 on the second connector 120.

As shown in FIGS. 6B and 7B, with the handle 144 of the lever 140 and the position confirmation device 400 unfastened, when the lever 140 is rotated upward from the complete locked state and the locking protrusions 145 of the lever 140 are locked to the protrusive steps 129 of the pressing portion 128 of the second connector 120, the first connector 110 and the second connector 120 enter the intermediate locked state.

In the intermediate locked state, the locking protrusions 145 of the lever 140 are locked to the protrusive steps 129 of the pressing portions 128, so the lever 140 is restricted without rotating no longer in the disconnection direction.

In the intermediate locked state, when the locking protrusions 145 are unlocked from the protrusive steps 129 by pressing the pressing portions 128 at the left and right sides of the outer housing 123 of the second connector 120 and then the lever 140 are further rotated upward, the first connector 110 and the second connector 120 enter the complete disconnected state.

The following Table 1 shows the states of the terminals and a current flow state in the intermediate locked state of the connector assembly.

TABLE 1

| | | Whether contact or not | Current state |
|---|---|---|---|
| Terminal state | Interlock terminal | Contact | Open |
| | Power terminal | Non-contact | open |

As can be seen from Table 1, in the intermediate locked state, the interlock terminal 115 of the first connector 110 and the interlock terminal 123 of the second connector 120 are separated from each other in the non-contact state, in which the two interlock terminals 115 and 132 that are signal terminals are separated from each other in the open state.

As described above, as the interlock terminals 115 and 132 of the two connectors are separated from each other, a connector disconnection signal can be input to a controller (not shown). Accordingly, the controller performs control for cutting the power such that a current does not flow through the power terminals 114 and 131.

Accordingly, in the intermediate locked state, a current does not flow not only through the interlock terminals 115 and 132, but through the power terminals 114 and 131. That is, not only the interlock terminals 115 and 132, but the power terminals 114 and 131 enter the complete open state by the control for cutting the power.

However, in the intermediate locked state, only the power is cut such that a current does not flow between the power terminal 114 of the first connector 110 and the power terminal 131 of the second connector and the two power terminals 114 and 131 keep physically connected to each other (see Table 1).

As described above, in the intermediate locked state, the interlock terminals 115 and 132 are first separated from each other and a connector disconnection signal is input to the controller, and then the controller cuts the power such that a current does not flow to the power terminals 114 and 131 keeping in contact with each other. Accordingly, it is possible to separate the power terminals 114 and 131 by further additionally operating the lever 140 with the power stably cut. In this case, the connectors 110 and 120 can be safely disconnected and separated without a spark, so electrical safety can be secured.

FIGS. 8A, 8B, 9A, 9B, 10A, and 10B are views showing states of the interlock terminals 115 and 132 and the power terminals 114 and 131 in the complete locked state and the intermediate locked state of the connector assembly according to an embodiment of the present disclosure.

Figure 8A:
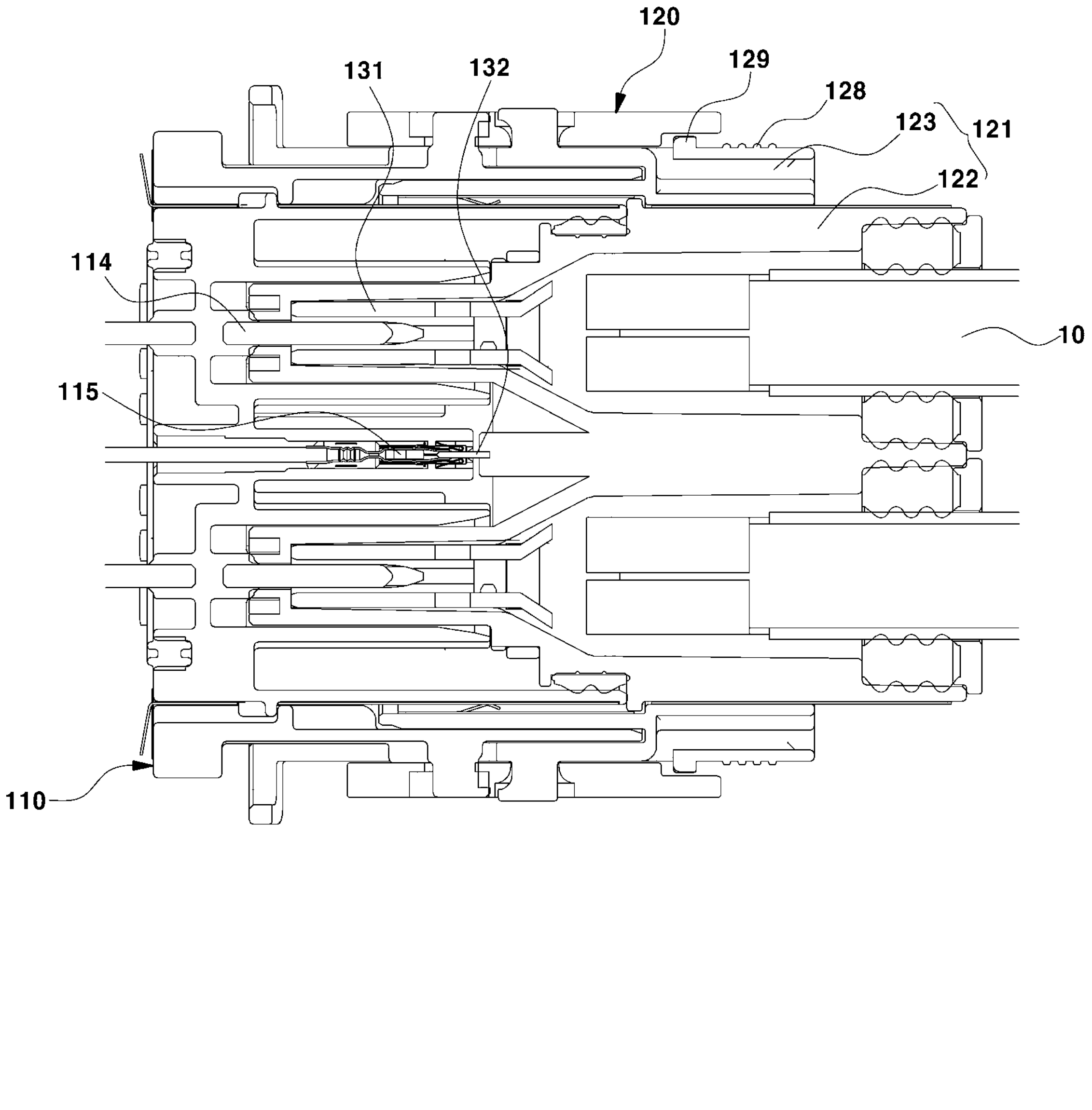
FIGS. 8A, 8B, 9A, 9B, 10A, and 10B are views showing states of interlock terminals and power terminals in the complete locked state and the intermediate locked state of the connector assembly according to an embodiment of the present disclosure.
Figure 8B:
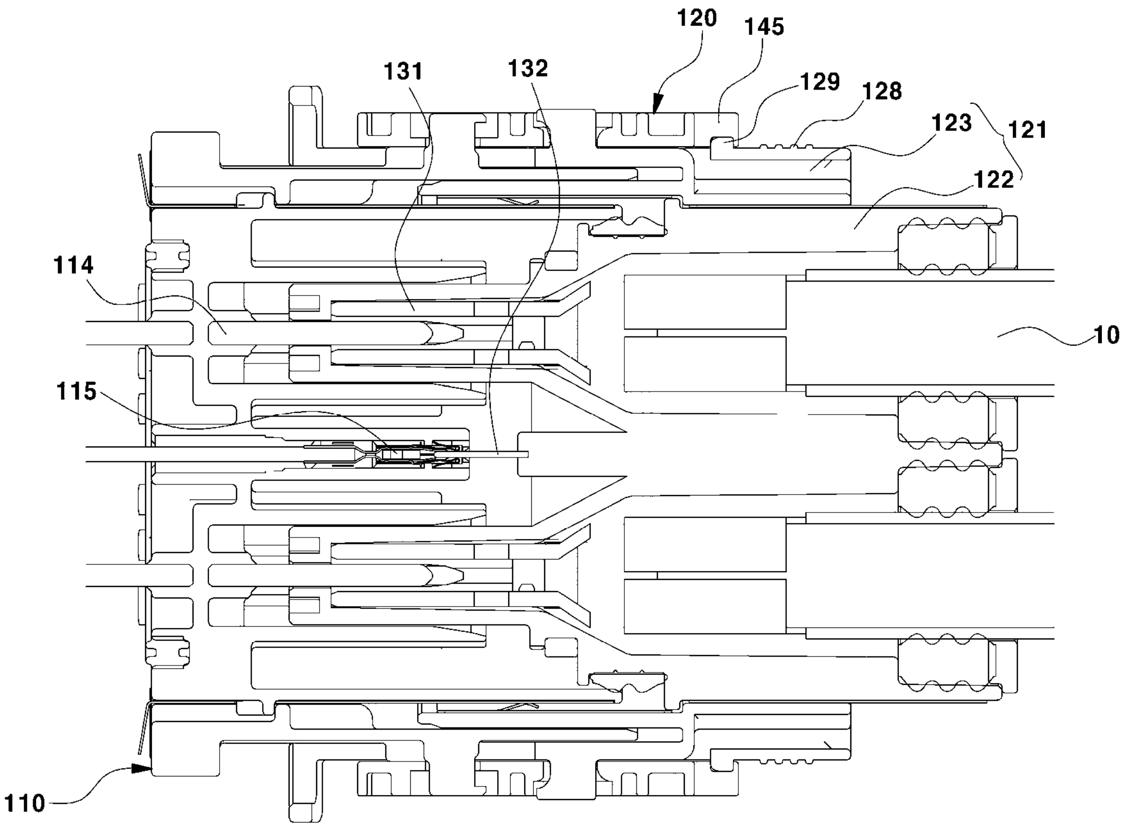

FIGS. 8A and 8B are cross-sectional views respectively taken along line A-A in FIG. 7A and line B-B in FIG. 7B. FIG. 8A shows the states of the interlock terminals 115 and 132 and the power terminals 114 and 131 in the complete locked state of the first connector 110 and the second connector 120 and FIG. 8B shows the states of the interlock terminals 115 and 132 and the power terminals 114 and 131 in the intermediate locked state of the first connector 110 and the second connector 120.

Figure 9A:
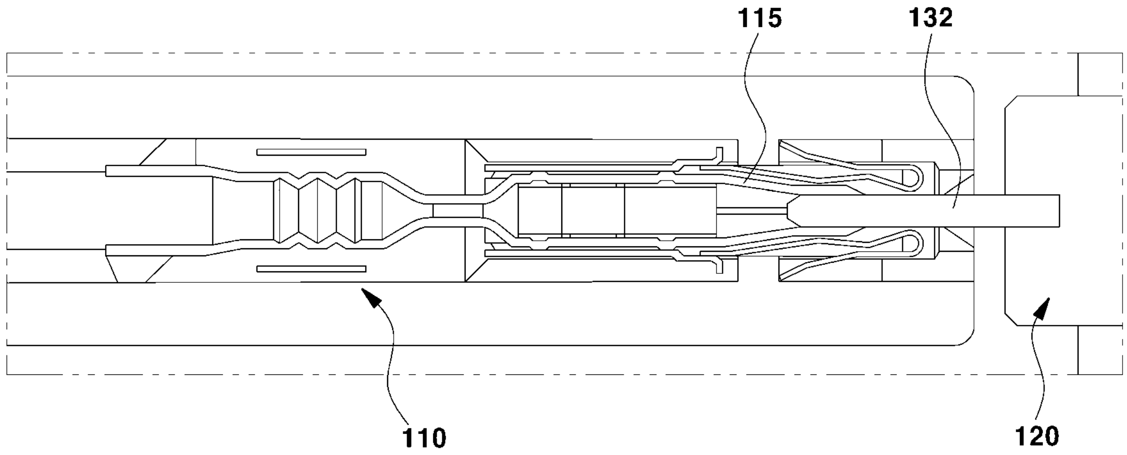
Figure 9B:
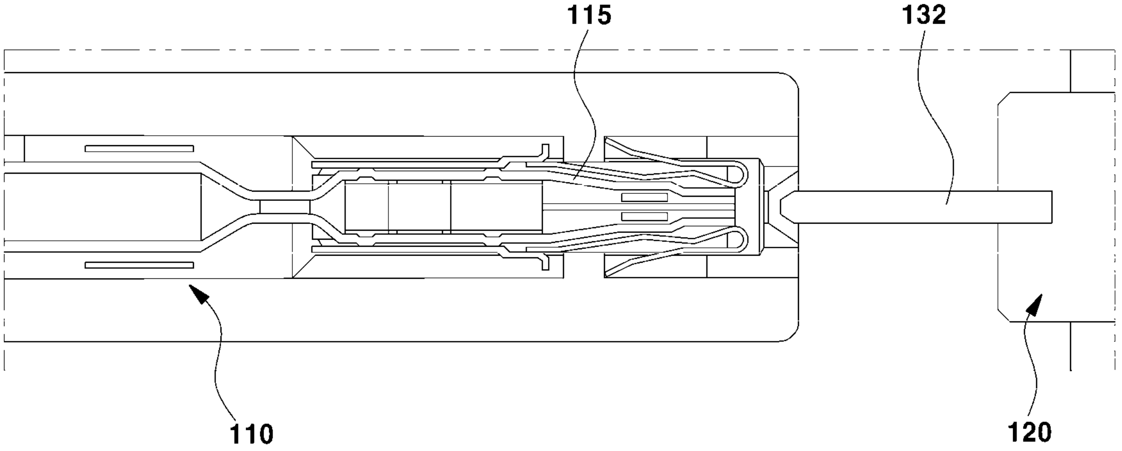
Figure 10A:
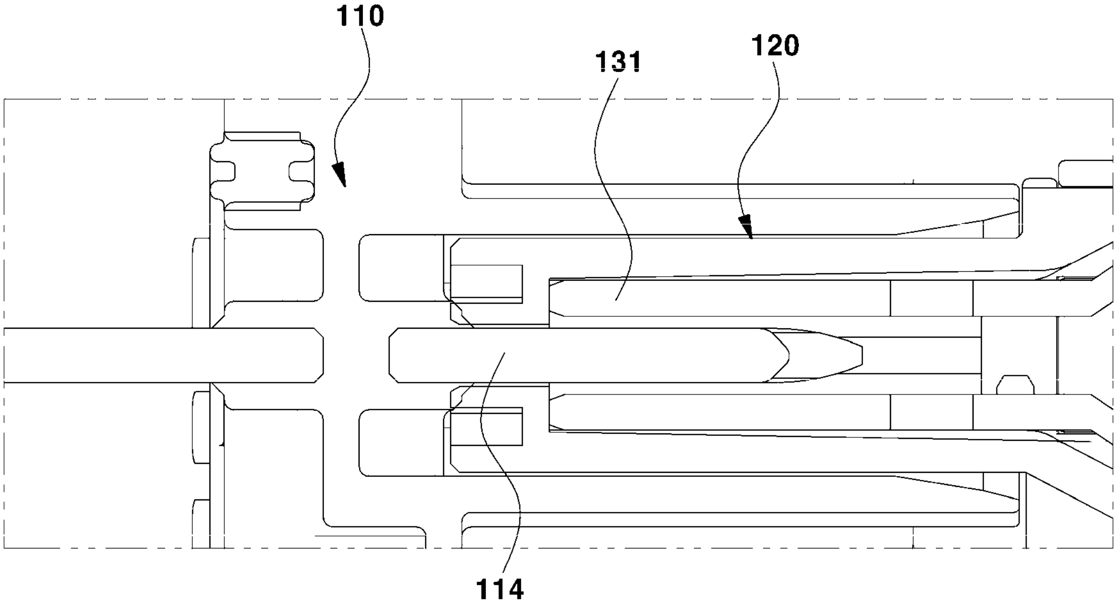
Figure 10B:
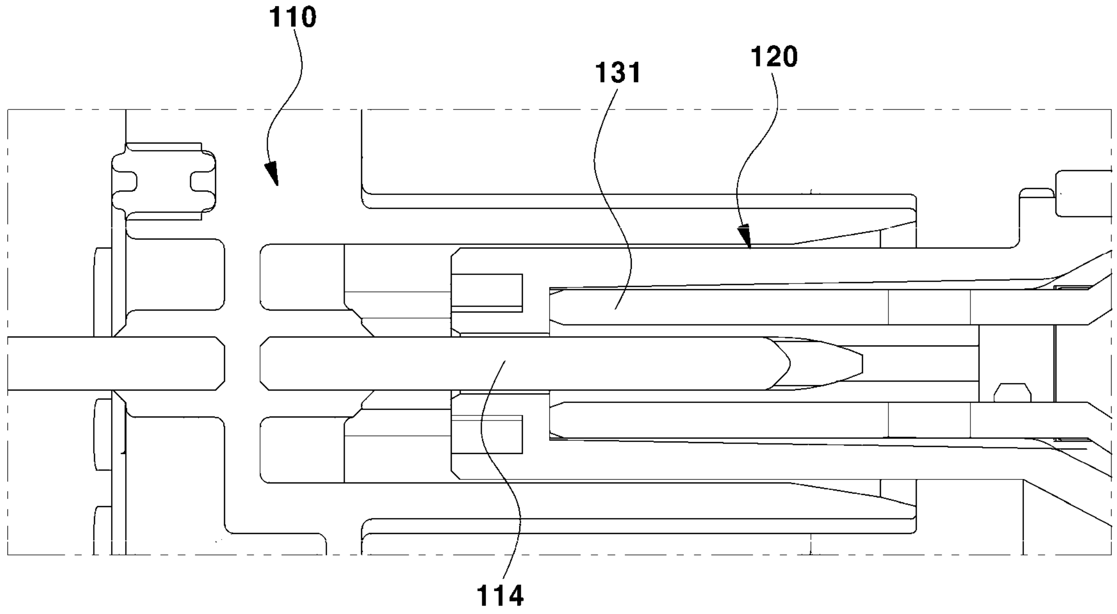

FIG. 9A is an enlarged view showing the states of the interlock terminals 115 and 132 in the complete locked state and FIG. 9B is an enlarged view showing the states of the interlock terminals 115 and 132 in the intermediate locked state. FIG. 10A is an enlarged view showing the states of the power terminals 114 and 131 in the complete locked state and FIG. 10B is an enlarged view showing the states of the power terminals 114 and 131 in the intermediate locked state.

As can be seen from FIGS. 8A and 9A, in the complete locked state, the interlock terminal 115 of the first connector 110 and the interlock terminal 132 of the second connector 120 keep in contact with each other, and the power terminal 114 of the first connector 110 and the power terminal 131 of the second connector 120 also keep in contact with each other.

However, as can be seen from FIGS. 8B and 9B, in the intermediate locked state, the interlock terminal 115 of the first connector 110 and the interlock terminal 132 of the second connector 120 are separated in the non-contact state, but the power terminal 114 of the first connector 110 and the power terminal 131 of the second connector 120 keep in contact with each other.

As described above, in the intermediate locked state, the power between the power terminals 114 and 131 is cut by the signal from the interlock terminals 115 and 132, and then intermediate locking is removed with the power cut and then the lever 140 is additionally operated, whereby the power terminals 114 and 131 are separated.

Figure 11A:
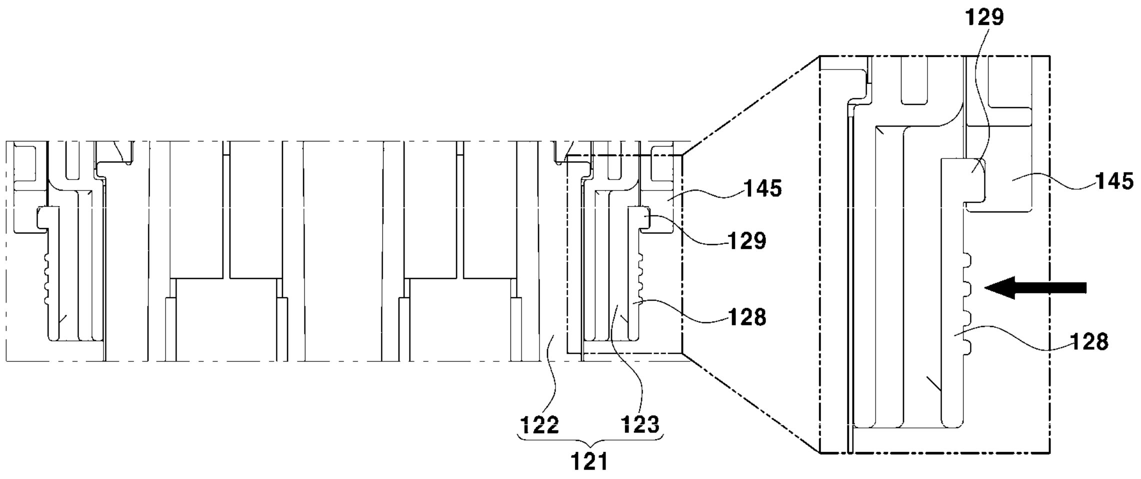
FIGS. 11A and 11B are cross-sectional views showing the state in which pressing portions are pressed to release a lever in the intermediate locked state in the connector assembly according to an embodiment of the present disclosure.
Figure 11B:
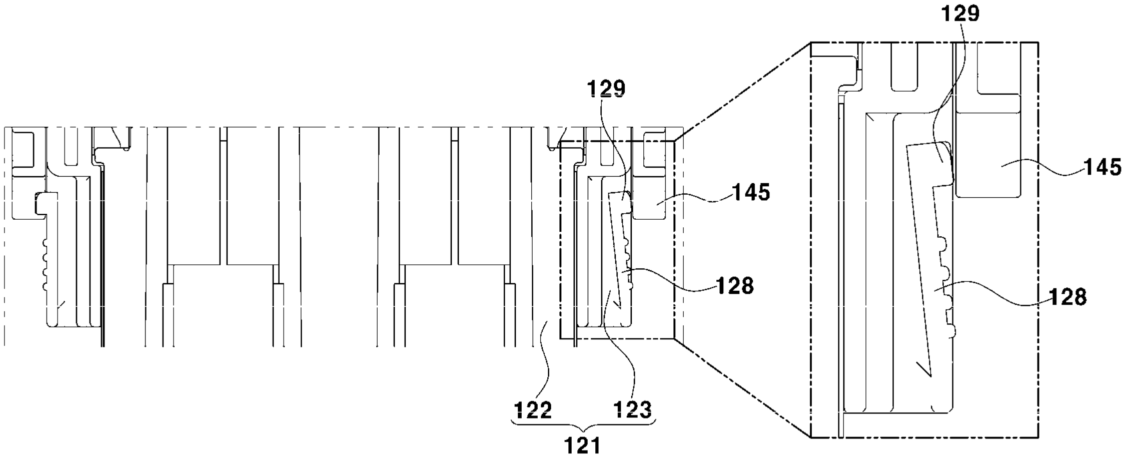

FIGS. 11A and 11B are cross-sectional views showing the state in which the pressing portions are pressed to release the lever in the intermediate locked state in the connector assembly according to an embodiment of the present disclosure.

As shown in FIG. 11A, in the state before the pressing portions 128 formed at the outer housing 123 of the second connector 120 are pressed, that is, in the state before the pressing portions 128 are pressed into the outer housing 123, the locking protrusions 145 are locked to the protrusive steps 129 of the pressing portions 128 when the lever 140 is rotated to the intermediate locked position.

In this state, the lever 140 cannot be further rotated in the connector disconnection direction at the intermediate locked state, and a lever locked state in which rotation of the lever is restricted is maintained. In this state, the interlock terminals 115 and 132 of the two connectors 110 and 120 are separated from each other and the power terminals 114 and 131 can maintain the intermediate locked state in which they are in contact with each other.

Further, in this state, the power is cut such that a current does not flow between the power terminals 114 and 131 of the two connectors 110 and 120, thereby implementing the open state. Thereafter, in order to completely disconnect the first connector 110 and the second connector 120 of the connector assembly, when an operator presses the pressing portions 128 at left and right sides with hands, the pressing portions 128 are bent inward in the holes 127 of the outer housing 123, whereby the locking protrusions 145 can be unlocked from the protrusive steps 129.

As described above, after the locking protrusions 145 are unlocked, the lever 140 can be further rotated in the connector disconnection direction, and accordingly, the power terminals 114 and 131 of the two connectors 110 and 120 are also separated from each other into the non-contact state.

As a result, since the power terminals 114 and 131 of the two connectors 110 and 120 are separated from each other in the open state, a spark at the power terminals can be prevented. Further, even if the connectors are forcibly disconnected by a mistake by an operator or other reasons, a spark is prevented, whereby ensuring electrical safety.

Further, according to connector assemblies of the related art in which interlock terminals are inserted in a CPA (a device for connector position confirmation) and installed in connectors, when the CPA having an interlock function is not completely fastened or the CAP is separated by external force or other reasons after fastened, power terminals enter the open state when the interlock terminals are separated, so the power is cut while a vehicle is driven, which may cause an accident.

However, according to the present disclosure, since the interlock terminals 115 and 132 are installed in the connectors 110 and 120 and there is an intermediate locking mechanism including the locking protrusions 145 of the lever 140 and the pressing portions 128 and the protrusive steps 129 of the second connector 120, it is possible to solve the problem of an accident described above.

Although embodiments of the present disclosure were described above in detail, the spirit of the present disclosure is not limited thereto and the present disclosure may be changed and modified in various ways on the basis of the basic concept without departing from the scope of the present disclosure described in the following claims.

The invention claimed is:

1. A connector assembly comprising:

a first connector having an interlock terminal and a power terminal;

a second connector having an interlock terminal and a power terminal;

a lever coupled to the second connector and moving the first connector in a connection direction and a disconnection direction with respect to the second connector when being moved on the second connector; and an intermediate locking mechanism restricting movement of the lever such that an intermediate locked state of the two connectors, in which the interlock terminals of the two connectors are separated from each other and the power terminals of the two connectors are kept in contact with each other, can be maintained.

2. The connector assembly of claim 1, wherein the intermediate locking mechanism comprises:

locking protrusions formed at the lever;

pressing portions formed at a connector housing of the second connector, the pressing portions being able to be pressed and bent; and protrusive steps formed to lock the locking protrusions of the lever such that the lever is not moved in the disconnection direction of the connectors in the intermediate locked state of the two connectors.

3. The connector assembly of claim 2, wherein the pressing portions are formed in plate shapes extending forward from rear edges of holes formed at the connector housing of the second connector to be positioned inside the holes, and are bent into the connector housing.

4. The connector assembly of claim 3, wherein the protrusive steps are formed on outer surfaces of a front of each of the pressing portions.

5. The connector assembly of claim 2, wherein the lever comprises:

lever bodies at left and right sides coupled to both left and right sides of the connector housing of the second connector; and a handle integrally connecting the lever bodies at left and right sides.

6. The connector assembly of claim 5, wherein the locking protrusions are formed at the lever bodies at left and right sides of the lever.

7. The connector assembly of claim 6, wherein the pressing portions are formed on the left and right sides of the connector housing of the second connector.

8. The connector assembly of claim 5, wherein cooperative protrusions are formed on left and right sides of a connector housing of the first connector, guide holes in which the cooperative protrusions of the first connector are inserted are formed in the left and right sides of the connector housing of the second connector, slots in which the cooperative protrusions passing through the guide holes are inserted are formed in the lever bodies at the left and right sides, and the slots of the lever bodies have curved paths for guiding the cooperative protrusions along the guide holes when the lever is moved.

9. The connector assembly of claim 1, wherein cooperative protrusions are formed at the first connector, guide holes in which the cooperative protrusions of the first connector are inserted are formed at the second connector, and the lever moves the cooperative protrusions along the guide holes of the second connector when moving on the second connector together with the cooperative protrusions of the first connector.

10. The connector assembly of claim 9, wherein slots in which the cooperative protrusions passing through the guide holes are inserted are formed at the lever, and the slots are formed to have curved paths for guiding the cooperative protrusions along the guide holes when the lever is moved.

* * * * *